Aug. 4, 1959     J. W. L. KÖHLER ET AL     2,898,166

METAL PISTON

Filed July 20, 1955

INVENTORS
JACOB WILLEM LAURENS KOHLER
JOSÉ JAN WILLEM DEN HAAN
BY
AGENT

United States Patent Office 2,898,166
Patented Aug. 4, 1959

2,898,166
METAL PISTON

Jacob Willem Laurens Köhler and José Jan Willem Den Haan, Emmasingel, Eindhoven, Netherlands, assignors, by mesne assignments, to North American Philips Company, Inc., New York, N.Y., a corporation of Delaware Application July 20, 1955, Serial No. 523,259

Claims priority, application Netherlands August 18, 1954

1 Claim. (Cl. 309—23)

The invention relates to a metal piston intended, particularly, for use in piston machines, in which the medium contained therein should preferably not be contaminated by lubricant. Such machines may, for example, be hot-gas reciprocating machines and compressors. A hot-gas reciprocating machine should be understood to mean herein a hot-gas engine, a refrigerator operating on the reversed hot-gas engine principle and a heat pump.

It is known to provide piston machines with a piston not having a piston ring, but having a certain, though small amount of play in its reciprocating movement in the cylinder. The cylinder and the piston could be made of metal, so that the running surfaces are constituted by metal, but this would in general require abundant lubrication. In the case of such a lubrication it is likely that lubricant finds its way into the working space of the machine. With these machines this is undesirable for various reasons. In the hot-gas reciprocating machines the lubricant may be drawn along with the working medium to the heat exchangers, in which it may be deposited, so that the output of the machine is reduced. Moreover, the generator may be choked.

With compressors it is also undesirable for the compressed gas to be contaminated by lubricant. If for example carbon dioxide is compressed to obtain solid carbon dioxide, the lubricant will be left after the solid carbon dioxide has been evaporated, which may give rise to a disagreeable taste of the product cooled by the solid carbon dioxide.

The piston could be made from a material which ensures a smooth running and requires no or only little lubrication. Such materials are, for example, wood or a polyethene compound, for example Teflon, or a polyamide, for example nylon. However, these materials have the disadvantage that they have a higher expansion coefficient than metals and they are, moreover, often sensitive to atmospheric influences, so that the gap between the piston and the cylinder could become inadmissibly large.

The invention has for its object to mitigate this disadvantage.

According to the invention a piston is provided with a layer of porous organic material in a thickness of not more than 2 mms., preferably of 0.5 mm.

This porous organic material may be constituted by wood or a fibre mass impregnated with a thermo-resistant synthetic resin or by metal compounds impregnated with a thermo-resistant synthetic resin. It is important for the material to ensure a satisfactorily smooth running.

According to a further aspect of the invention the piston is constructed as a displacer for use in a hot-gas reciprocating machine. As stated above, the use of the piston according to the invention is particularly important for hot-gas machines. A layer of organic material may be applied to the piston, for example similarly to veneer, for example by gluing. Then this layer may be machined, for example ground to obtain the desired thickness.

The invention will be described more fully with reference to one embodiment.

Figure 1:
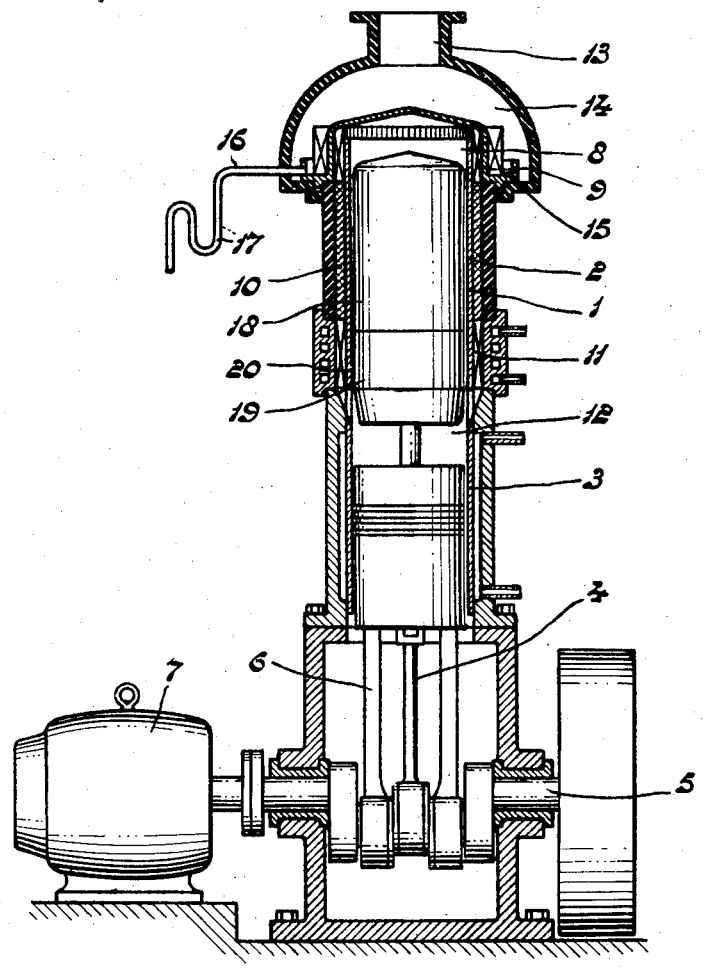
Fig. 1 shows a cold-gas refrigerator comprising a displacer, the running surface of which is coated with a layer of organic material.

The cold-gas refrigerator shown in Fig. 1 is of the so-called displacer type and comprises a cylinder 1, in which a displacer 2 and a piston 3 reciprocates with a substantially constant phase difference. This displacer 2 is coupled by means of a connecting rod system 4 with a crank of a crank shaft 5 and the piston 3 is coupled by connecting rods 6 with cranks of the same crank shaft. The machine is driven by an electric motor 7. Owing to the reciprocating movement of the displacer 2 the volume of a freezing space over the displacer is varied. This space communicates through a freezer 9, a regenerator 10 and a cooler 11 with the cooled space 12, which is provided between the displacer and the piston. In the freezing space 8 occurs mainly expansion and in the cooled space 12 occurs mainly compression. The heat supplied to the working medium of the machine during the expansion may be withdrawn from a medium to be cooled and this medium is supplied through an aperture 13 to a condenser space 14, in which the medium, for example air, can condense, after which the condensate is collected in an annular duct 15. The condensate can then be conducted away through a duct 16, which comprises a liquid trap 17.

Figure 2:
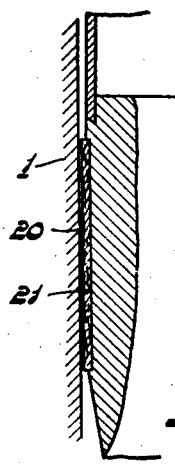
Fig. 2 shows, on an enlarged scale, part of the displacer of this machine.

The displacer comprises a displacer cap 18 and a part 19, which has a running surface of organic material. As is evident from Figs. 1 and 2 (Fig. 2 showing part of the displacer on an enlarged scale) the displacer does not comprise piston rings, so that between the wall of the displacer and the cylinder a narrow gap 20 is left. The difference in diameter between the cylinder and the displacer may be for example $60/\mu$ at room temperature.

To the metal displacer body is applied a layer of wood 21, which may, if desired, be impregnated with lubricant. This layer has, in this embodiment, a thickness of 0.5 mm.; in general, it has a thickness of not more than 2 mms.

What is claimed is:

A metal piston for use in a hot-gas reciprocating machine comprising a continuous layer of porous organic material of a thickness at most of 2 mms. affixed to the circumference of said piston and constituting substantially the entire outer circumferential surface thereof, said hot-gas reciprocating machine comprising a cylinder, two pistons operating in said cylinder with a constant phase difference which together with said cylinder define two chambers in which a closed thermodynamic cycle is performed by a gaseous medium, the volume of gaseous medium in said chambers varying continuously while one of said chambers has a low temperature and the other chamber has a higher temperature, a cooler, a regenerator and a freezer connecting the chambers with one another.

References Cited in the file of this patent
UNITED STATES PATENTS

| | | |
|---|---|---|
| 301,541 | Weimer | July 8, 1884 |
| 1,355,802 | Williams | Oct. 12, 1920 |
| 1,772,565 | McKone | Aug. 12, 1930 |
| 2,703,739 | Koplin | Mar. 8, 1955 |